United States Patent
Lee et al.

(10) Patent No.: US 12,432,751 B2
(45) Date of Patent: Sep. 30, 2025

(54) METHOD AND APPARATUS FOR DETERMINING SIDELINK RESOURCES IN NR V2X

(71) Applicant: LG ELECTRONICS INC., Seoul (KR)

(72) Inventors: Seungmin Lee, Seoul (KR); Daesung Hwang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 434 days.

(21) Appl. No.: 17/917,896

(22) PCT Filed: Apr. 7, 2021

(86) PCT No.: PCT/KR2021/004327
§ 371 (c)(1),
(2) Date: Oct. 7, 2022

(87) PCT Pub. No.: WO2021/206438
PCT Pub. Date: Oct. 14, 2021

(65) Prior Publication Data
US 2023/0144804 A1    May 11, 2023

(30) Foreign Application Priority Data

Apr. 7, 2020 (KR) .................. 10-2020-0042297

(51) Int. Cl.
*H04W 56/00* (2009.01)
*H04W 72/0446* (2023.01)
*H04W 72/25* (2023.01)

(52) U.S. Cl.
CPC ......... *H04W 72/25* (2023.01); *H04W 56/006* (2013.01); *H04W 72/0446* (2013.01)

(58) Field of Classification Search
CPC .. H04L 5/0053; H04W 4/40; H04W 56/0015; H04W 56/006; H04W 72/0446; H04W 72/25; H04W 72/40
See application file for complete search history.

(56) References Cited

U.S. PATENT DOCUMENTS

2017/0289935 A1*  10/2017  Yoon ..................... H04L 5/0053
2018/0220388 A1*   8/2018  Chae ..................... H04W 76/14
2025/0016798 A1*   1/2025  Park ...................... H04W 72/00

FOREIGN PATENT DOCUMENTS

CN      108781423      11/2018
WO      2018031166      2/2018
(Continued)

OTHER PUBLICATIONS

European Patent Office Application Serial No. 21784623.7, Search Report dated Apr. 4, 2024, 6 pages.
(Continued)

*Primary Examiner* — Phuc H Tran
(74) *Attorney, Agent, or Firm* — LEE, HONG, DEGERMAN, KANG & WAIMEY

(57) ABSTRACT

According to one embodiment of the present disclosure, provided is a method, by which a first device performs sidelink communication. The method may comprise the steps of: receiving first synchronization information from a first synchronization source associated with a GNSS; receiving second synchronization information from a second synchronization source associated with a base station; determining, on the basis of a difference value between a first time point related to the first synchronization information and a second time point related to the second synchronization information being greater than a preset threshold, a first resource for transmission of a PSCCH on the basis of the second time point; transmitting, on the basis of the first resource, a first SCI through the PSCCH to a second device;

(Continued)

and transmitting, on the basis of a second resource determined on the basis of the first SCI, a second SCI and data through a PSSCH related to the PSCCH, the second SCI being different from the first SCI.

19 Claims, 19 Drawing Sheets

(56) References Cited

FOREIGN PATENT DOCUMENTS

| | | |
|---|---|---|
| WO | 2019216747 | 11/2019 |
| WO | 2020063873 | 4/2020 |

OTHER PUBLICATIONS

Samsung, "Feature lead summary #2 for agenda item 7.2.4.1 Physical layer structure for sidelink," 3GPP TSG-RAN WG1 #100-e, e-Meeting, R1-2001149, Feb. 2020, 18 pages.
Huawei, HiSilicon, "Remaining details of sidelink synchronization mechanisms," 3GPP TSG-RAN WG1 Meeting #100-e, e-Meeting, R1-2000185, Feb. 2020, 16 pages.
Nokia, "Remaining details of Sidelink Synchronization mechanism," 3GPP TSG-RAN WG1 #100-e, e-Meeting, R1-2000385, Feb. 2020, 15 pages.
Itri, "Remaining Issues on Sidelink Synchronization for NR V2X Communication," 3GPP TSG-RAN WG1 #100-e, e-Meeting, R1-2000696, Feb. 2020, 11 pages.
PCT International Application No. PCT/KR2021/004327, Written Opinion of the International Search Report dated Jul. 12, 2021, 4 pages.

* cited by examiner

FIG. 10
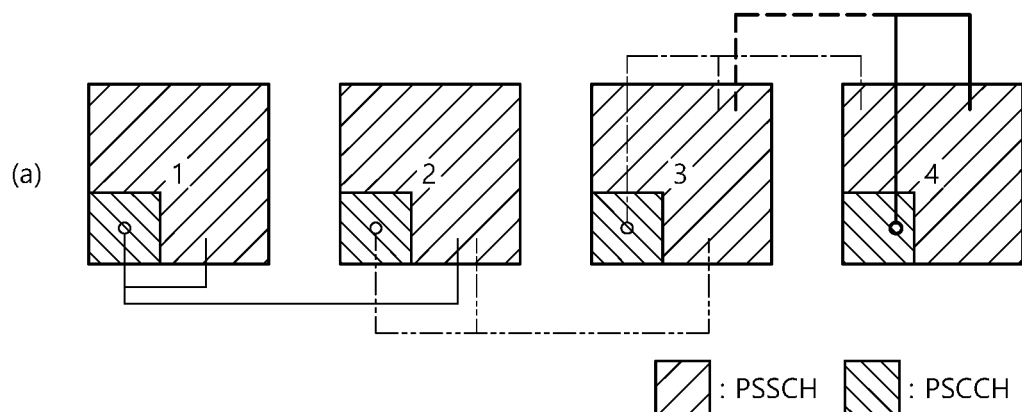
(a)
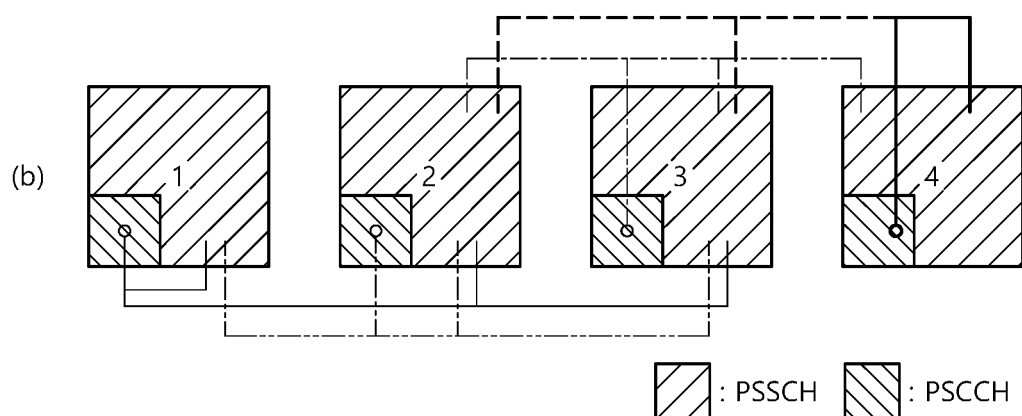
(b)
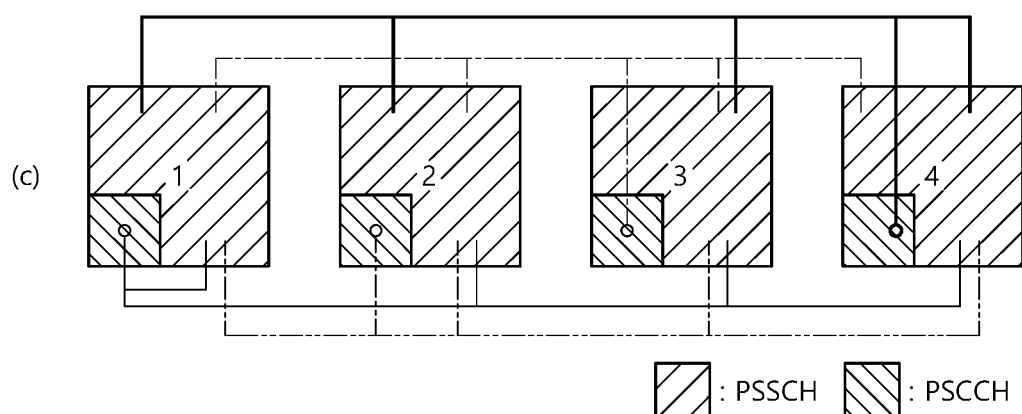
(c)

METHOD AND APPARATUS FOR DETERMINING SIDELINK RESOURCES IN NR V2X

CROSS-REFERENCE TO RELATED APPLICATIONS

This application is the National Stage filing under 35 U.S.C. 371 of International Application No. PCT/KR2021/004327, filed on Apr. 7, 2021, which claims the benefit of earlier filing date and right of priority to Korean Application No. 10-2020-0042297, filed on Apr. 7, 2020, the contents of which are all incorporated by reference herein in their entirety

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

A technical object of the present disclosure is to provide a sidelink (SL) communication method between devices (or UEs) and an apparatus (or UE) for performing the same.

Another technical object of the present disclosure is to provide a method for determining a sidelink transmission resource in NR V2X and an apparatus (or UE) for performing the same.

Another technical object of the present disclosure is to provide a method for performing synchronization based on synchronization information related to a GNSS and synchronization information related to a base station in NR V2X and an apparatus (or UE) for performing the same.

Technical Solutions

Based on an embodiment of the present disclosure, a method for performing sidelink communication by a first device may be provided. The method may comprise: receiving first synchronization information from a first synchronization source related to a global navigation satellite system (GNSS); receiving second synchronization information from a second synchronization source related to a base station; determining a first resource for transmission of a physical sidelink control channel (PSCCH) based on a second time, based on that a difference value between a first time related to the first synchronization information and the second time related to the second synchronization information is greater than a pre-configured threshold value; transmitting, to a second device through the PSCCH, first sidelink control information (SCI) based on the first resource; and transmitting, through a physical sidelink shared channel (PSSCH) related to the PSCCH, second SCI different from the first SCI and data based on a second resource determined based on the first SCI.

Based on an embodiment of the present disclosure, a first device adapted to perform sidelink communication may be provided. The first device may comprise: at least one memory storing instructions; at least one transceiver; and at least one processor connected to the at least one memory and the at least one transceiver, wherein the at least one processor executes the instructions to: control the at least one transceiver to receive first synchronization information from a first synchronization source related to a global navigation satellite system (GNSS); control the at least one transceiver to receive second synchronization information from a second synchronization source related to a base station; determine a first resource for transmission of a physical sidelink control channel (PSCCH) based on a second time, based on that a difference value between a first time related to the first synchronization information and the second time related to the second synchronization information is greater than a pre-configured threshold value; control the at least one transceiver to transmit, to a second device through the PSCCH, first sidelink control information (SCI) based on the first resource; and control the at least one transceiver to transmit, through a physical sidelink shared channel (PSSCH) related to the PSCCH, second SCI different from the first SCI and data based on a second resource determined based on the first SCI.

Effects of the Disclosure

The UE can efficiently perform SL communication.

In addition, based on the present disclosure, if the difference value (TIME_DIFVAL) between the timing derived from the GNSS and the timing derived from the base station is greater than the pre-configured threshold value (TIME_THVAL), the UE can perform SL communication based on synchronization related to the base station. Through this, it is possible to reduce the possibility of misunderstanding between the base station and the MODE 1 UE.

BRIEF DESCRIPTION OF THE DRAWINGS

FIG. 10 shows a method in which a UE that has reserved transmission resource(s) informs another UE of the transmission resource(s), based on an embodiment of the present disclosure.

DESCRIPTION OF EXEMPLARY EMBODIMENTS

Figure 1:
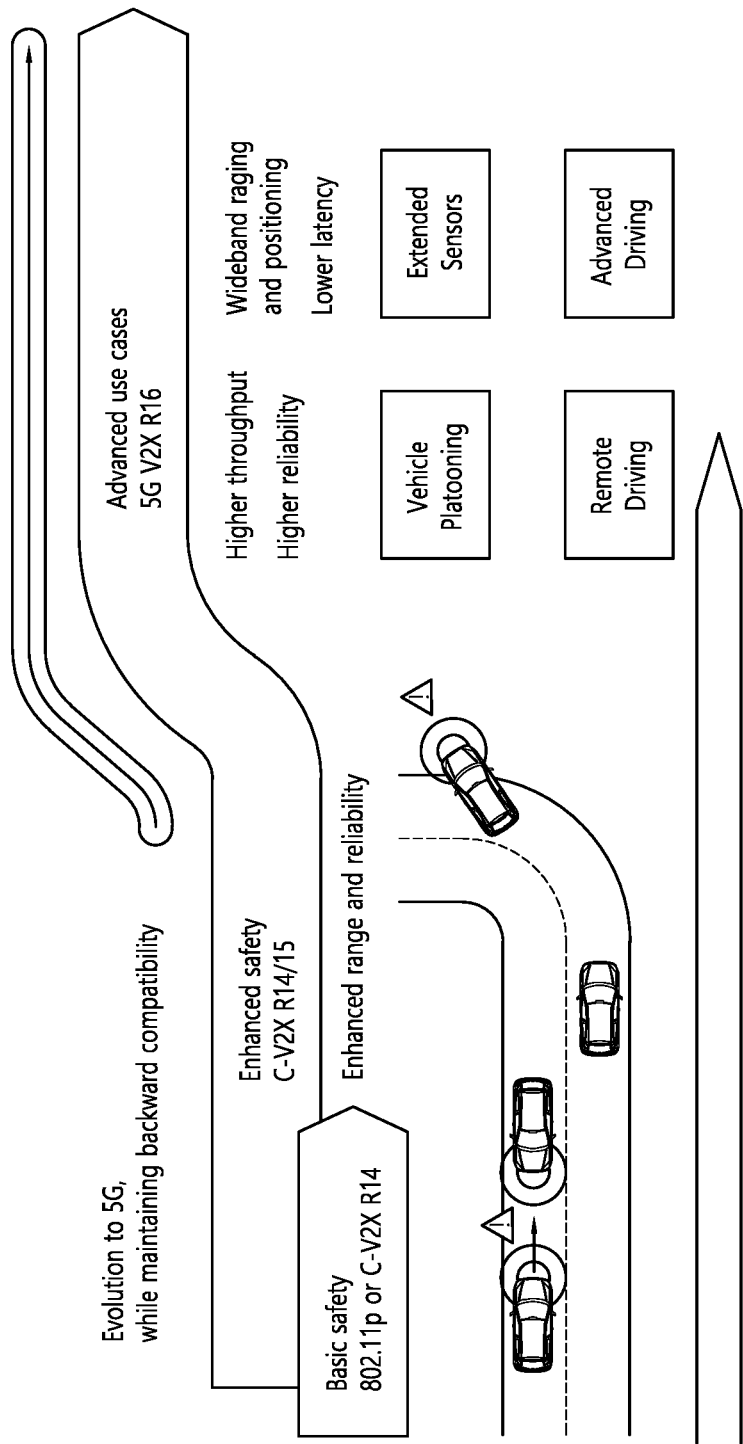
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
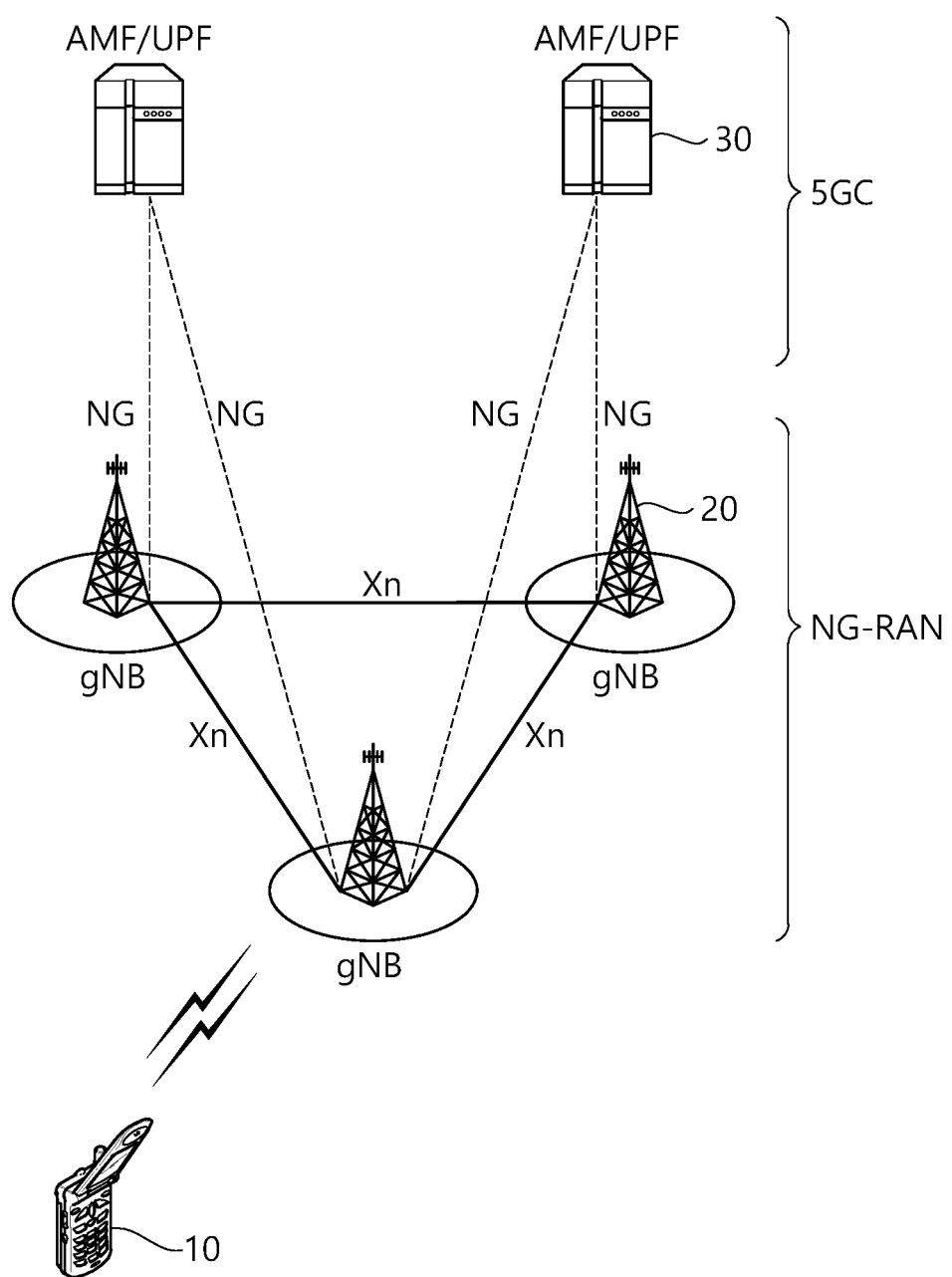
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
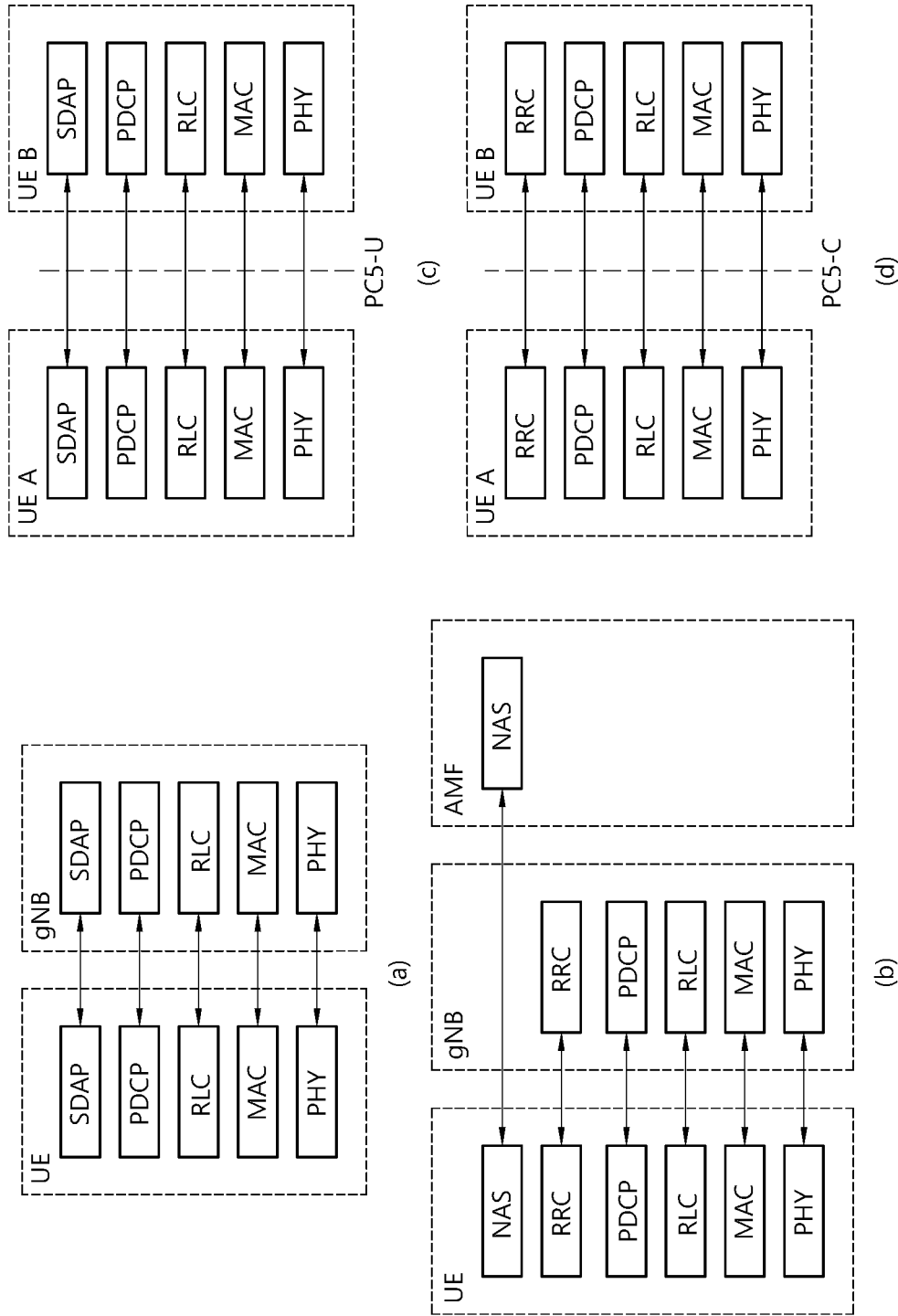
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
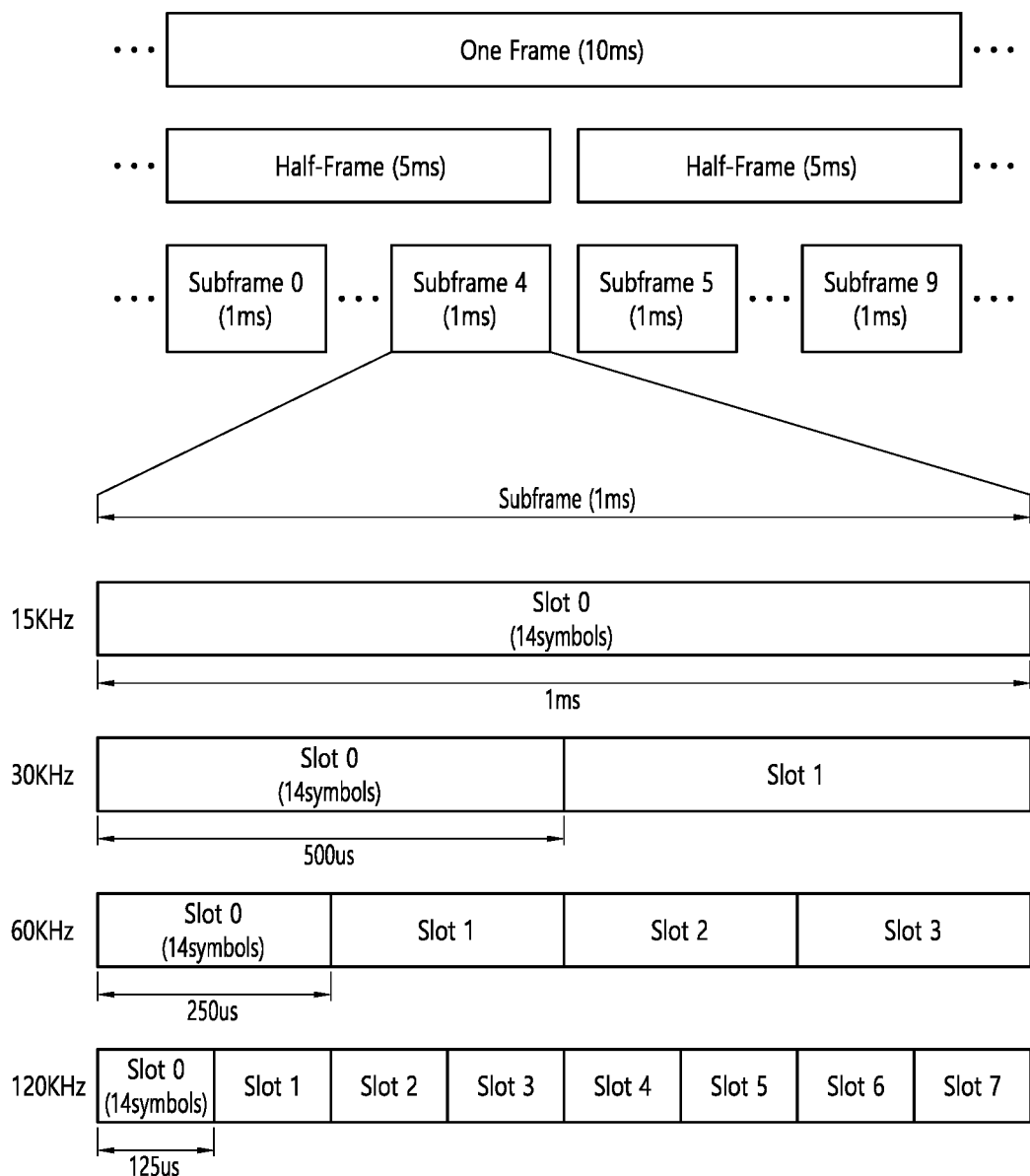
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame}_{slot}$), and a number of slots per subframe ($N^{subframe, u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
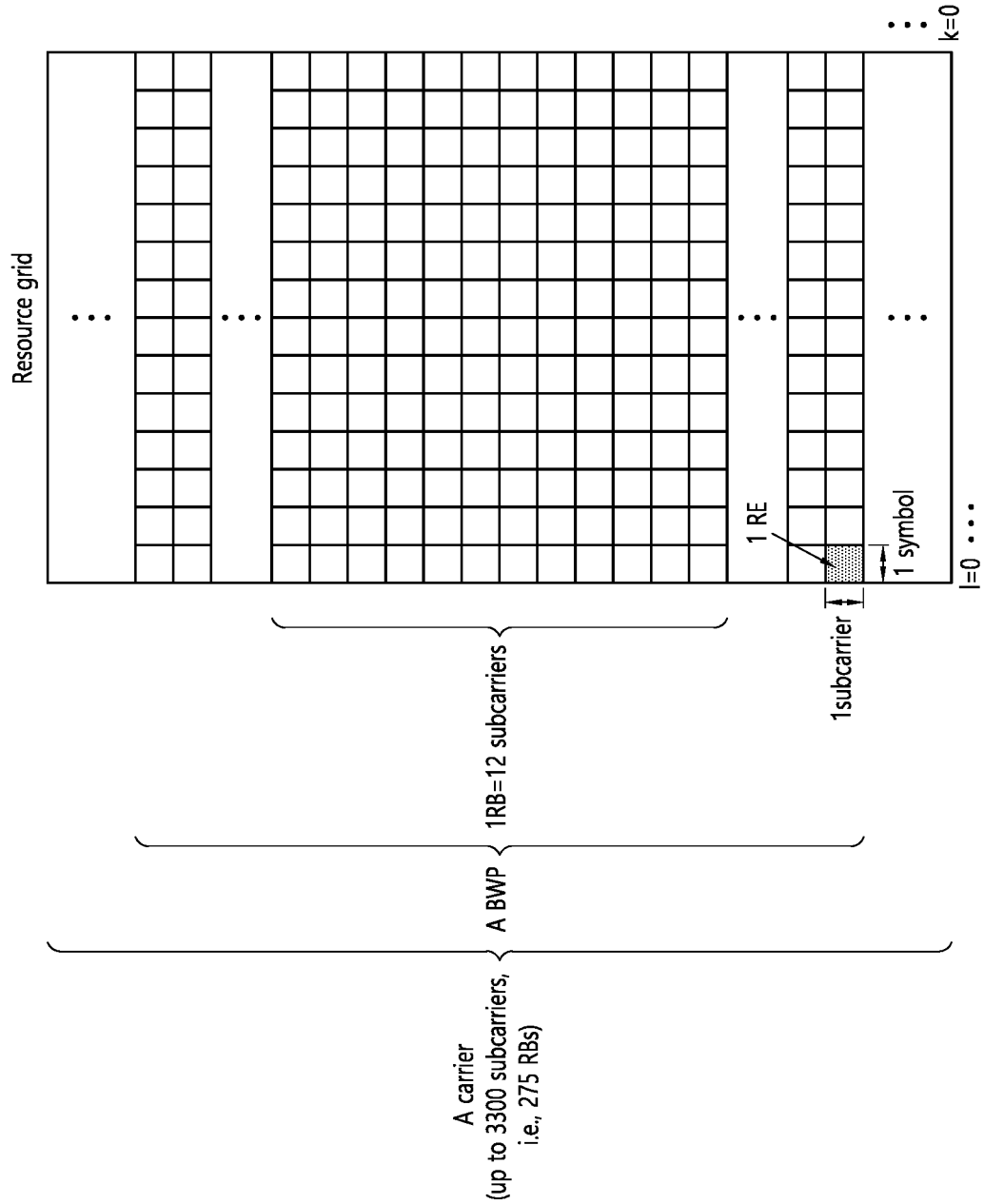
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
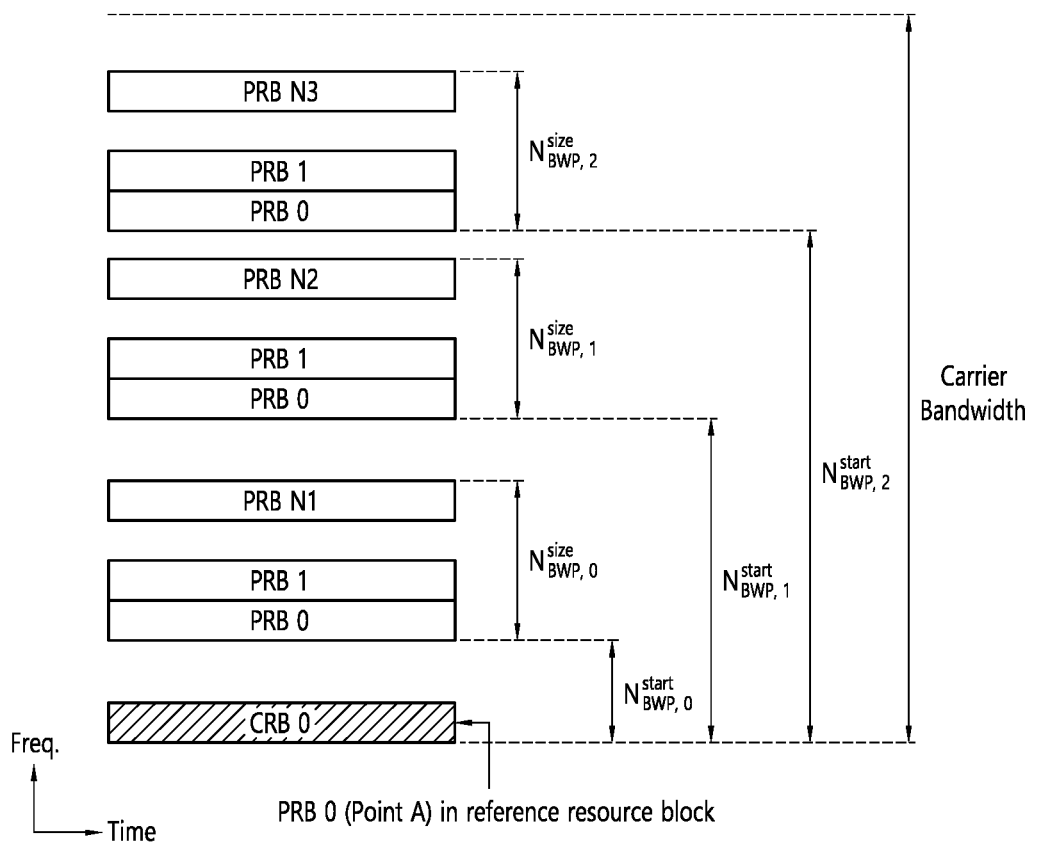
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
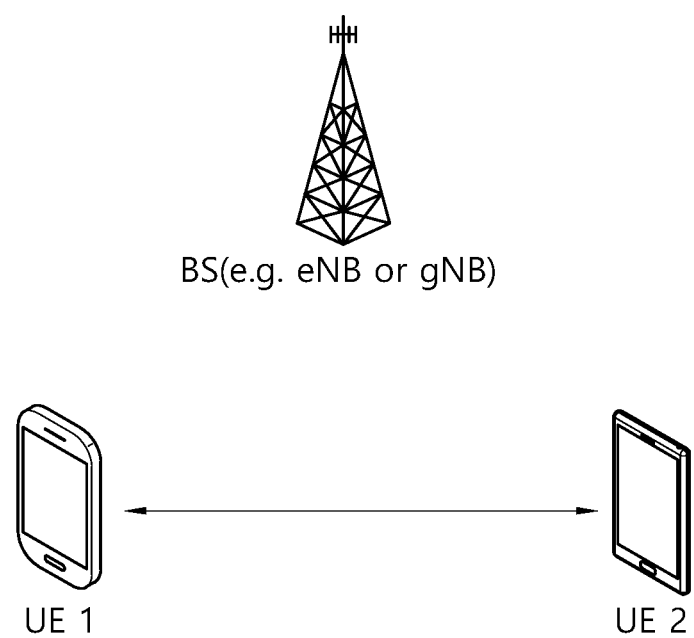
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
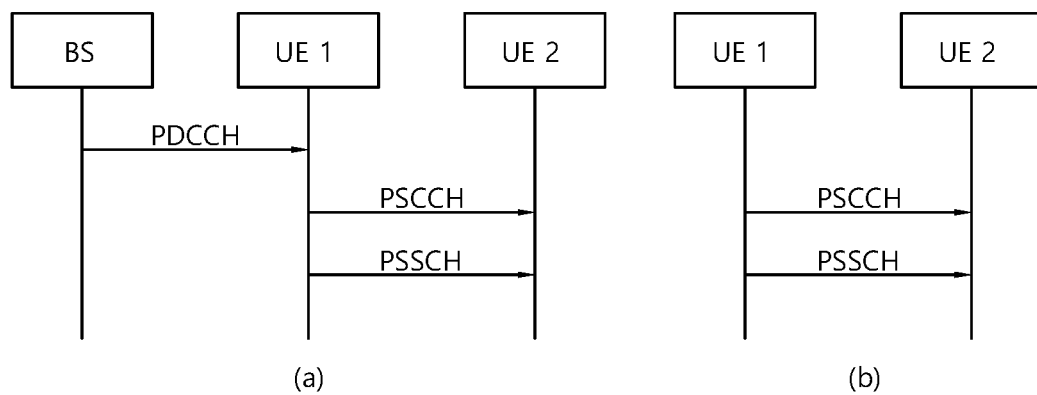
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
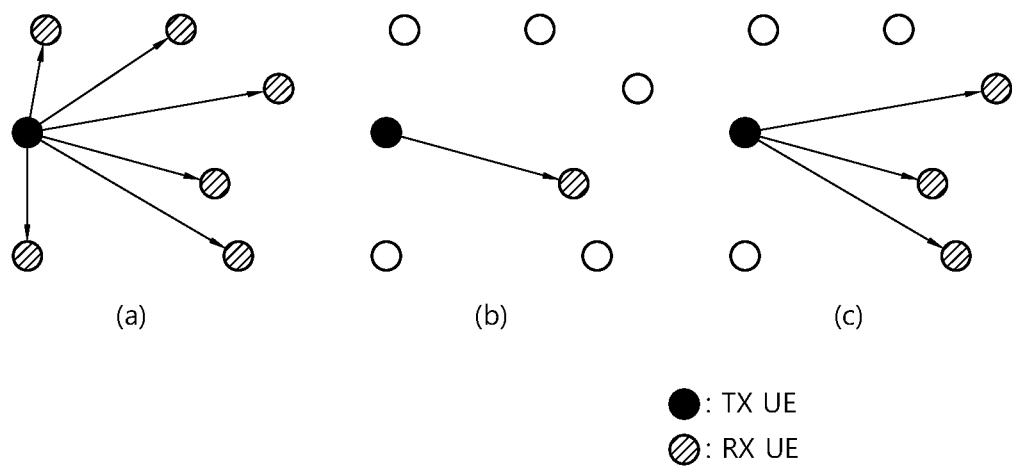
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure.

Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Figure 11:
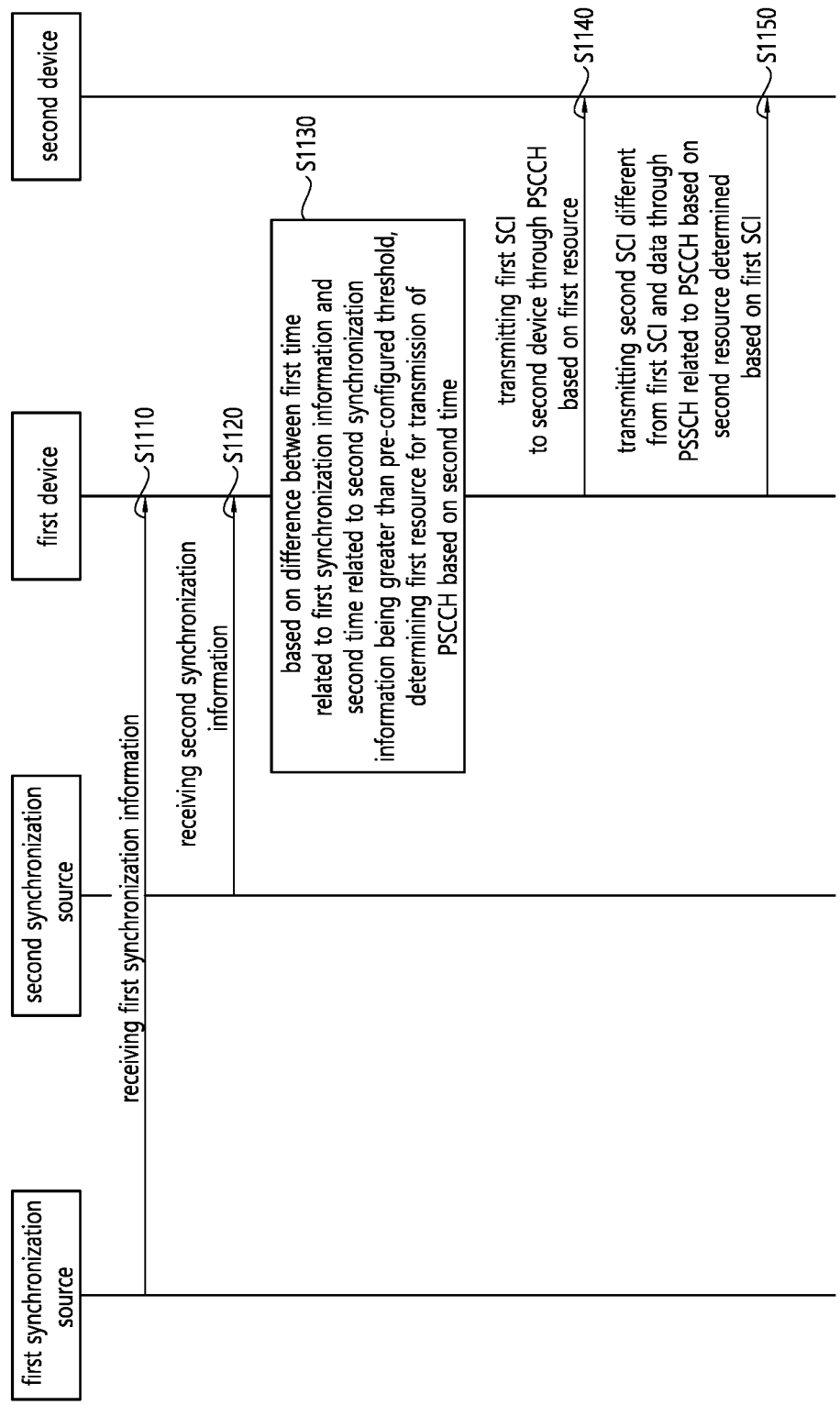
FIG. 11 shows a method for a first device and a second device to perform sidelink communication based on synchronization information received from a first synchronization source and/or a second synchronization source, based on an embodiment of the present disclosure.

FIG. 11 shows a method for a first device and a second device to perform sidelink communication based on synchronization information received from a first synchronization source and/or a second synchronization source, based on an embodiment of the present disclosure.

The first synchronization source shown in FIG. 11 may be, for example, a synchronization source related to a GNSS. The second synchronization source may be, for example, a synchronization source related to a base station.

In step S1110, the first device according to an embodiment may receive first synchronization information from the first synchronization source. In step S1120, the first device according to an embodiment may receive second synchronization information from the second synchronization source. In step S1130, based on the difference between a first time related to the first synchronization information and a second time related to the second synchronization information being greater than a pre-configured threshold, the first device according to an embodiment may determine a first resource for transmission of a physical sidelink control channel (PSCCH) based on the second time. In step S1140, the first device according to an embodiment may transmit first sidelink control information (SCI) to the second device through the PSCCH based on the first resource. In step S1150, the first device according to an embodiment may transmit second SCI different from the first SCI and data through a PSSCH related to the PSCCH based on a second resource determined based on the first SCI.

Hereinafter, embodiments and/or examples that can be directly or indirectly related to at least one of steps S1110 to S1150 will be described. Meanwhile, the following embodiments and/or examples only relate to at least one of steps S1110 to S1150, and therefore, even if at least one of the following embodiments and/or examples and steps S1110 to S1150 contradict each other in content, contradicted contents should not be construed outside the scope of the present disclosure.

For example, if there is the difference between a synchronization timing related to the SL MODE 1 TX/RX operation (e.g., GNSS) and a synchronization timing of the base station, SL MODE 1 TX timings assumed by the base station and the UE may be different. Due to this, a collision problem between UL TX and SL TX (and/or SL RX) (from the UE point of view), a confusion problem (between the base station and the UE) about the location of a UL resource (e.g., PUCCH) in which SL HARQ feedback information is transmitted, etc. may occur. In some embodiments of the present disclosure, methods for solving the above problem may be proposed.

For example, if the difference between the synchronization timing related to the SL MODE 1 TX/RX operation (e.g., GNSS) and the synchronization timing of the base station is greater than a pre-configured threshold, the UE may expect that a SL MODE 1 resource pool is configured based on the synchronization timing of the base station (e.g., SFN 0) (not the synchronization timing of the GNSS (e.g., DFN 0)), and the UE may expect that HIGHEST SYNC SOURCE PRIORITY (related to SL MODE 1 communication) is set to the base station. Herein, for example, the UE may be configured to report the difference value information (e.g., time difference value between SFN 0 and DFN 0, SLOT/SYMBOL BOUNDARY difference value, etc.) between the synchronization timing related to the SL MODE 1 TX/RX operation and the synchronization timing of the base station to the base station.

As another example, if the difference between the synchronization timing related to the SL MODE 1 TX/RX operation and the synchronization timing of the base station is greater than a pre-configured threshold, the UE may not expect that a PUCCH resource (e.g., for reporting SL HARQ feedback information) related to a reference timing of a PSFCH resource (based on the synchronization timing related to the SL MODE 1 TX/RX operation (e.g., GNSS)) is configured.

Based on the embodiments described above and/or the embodiments described below, the UE performing SL MODE 1 operation can efficiently support SL/WAN communication at the same time.

Proposed methods #1 to #4 described below may be implemented independently or may be implemented in combination with each other.

1. Proposed Method #1

1) Proposed Method #1-1

For example, if at least one of the first condition and/or the second condition proposed below is satisfied, the MODE 1 UE (or the first device) may not expect to apply and/or configure a bitmap related to a MODE 1 resource pool by using direct frame number (DFN) 0 based on a timing derived from the global navigation satellite system (GNSS). For example, if at least one of the first condition and/or the second condition proposed below is satisfied, the MODE 1 UE may not expect SL communication based on MODE 1 by using DFN 0 based on the timing derived from the GNSS. For example, if at least one of the first condition and/or the second condition proposed below is satisfied, the MODE 1 UE may determine not to apply and/or not configure the bitmap related to the MODE 1 resource pool by using DFN 0 based on the timing derived from the GNSS. For example, if at least one of the first condition and/or the second condition proposed below is satisfied, the MODE 1 UE may determine not to perform SL communication based on MODE 1 by using DFN 0 based on the timing derived from the GNSS.

For example, if at least one of the first condition and/or the second condition proposed below is satisfied, the MODE 1 UE may not expect to apply and/or configure the bitmap related to the MODE 1 resource pool by using DFN 0 based on the timing derived from a synchronization source having the GNSS as a synchronization reference. For example, if at least one of the first condition and/or the second condition proposed below is satisfied, the MODE 1 UE may not expect SL communication based on MODE 1 by using DFN 0 based on the timing derived from the synchronization source having the GNSS as the synchronization reference. For example, if at least one of the first condition and/or the second condition proposed below is satisfied, the MODE 1 UE may determine not to apply and/or not configure the bitmap related to the MODE 1 resource pool by using DFN 0 based on the timing derived from the synchronization source having GNSS as the synchronization reference. For example, if at least one of the first condition and/or the second condition proposed below is satisfied, the MODE 1 UE may determine not to perform SL communication based on MODE 1 by using DFN 0 based on the timing derived from the synchronization source having the GNSS as the synchronization reference.

For example, if at least one of the first condition and/or the second condition proposed below is satisfied, the MODE 1 UE may expect or assume to apply and/or configure the bitmap related to the MODE 1 resource pool by using SFN 0 the timing derived from the base station. For example, if at least one of the first condition and/or the second condition proposed below is satisfied, the MODE 1 UE may expect or assume that SL communication based on MODE 1 is performed by using SFN 0 based on the timing derived from the base station. For example, if at least one of the first condition and/or the second condition proposed below is satisfied, the MODE 1 UE may apply and/or configure the bitmap related to the MODE 1 resource pool by using SFN 0 based on the timing derived from the base station. That is, if at least one of the first condition and/or the second condition proposed below is satisfied, the MODE 1 UE may apply and/or configure the bitmap related to the MODE 1 resource pool by using SFN 0 based on the timing derived from the base station, instead of DFN 0 based on the timing derived from the GNSS and/or the synchronization source having the GNSS as the synchronization reference. For example, if at least one of the first condition and/or the second condition proposed below is satisfied, the MODE 1 UE may perform SL communication based on MODE 1 by using SFN 0 based on the timing derived from the base station. That is, if at least one of the first condition and/or the second condition proposed below is satisfied, the MODE 1 UE may perform SL communication based on MODE 1 by using SFN 0 based on the timing derived from the base station, instead of DFN 0 based on the timing derived from the GNSS and/or the synchronization source having the GNSS as the synchronization reference.

For example, if at least one of the first condition and/or the second condition proposed below is satisfied, the MODE 1 UE may expect or assume to apply and/or configure the bitmap related to the MODE 1 resource pool by using SFN 0 based on the timing derived from a synchronization source having the base station as a synchronization reference. For example, if at least one of the first condition and/or the second condition proposed below is satisfied, the MODE 1 UE may expect or assume that SL communication based on MODE 1 is performed by using SFN 0 based on the timing derived from the synchronization source having the base station as the synchronization reference. For example, if at least one of the first condition and/or the second condition proposed below is satisfied, the MODE 1 UE may apply and/or configure the bitmap related to the MODE 1 resource pool by using SFN 0 based on the timing derived from the synchronization source having the base station as the synchronization reference. That is, if at least one of the first condition and/or the second condition proposed below is satisfied, the MODE 1 UE may apply and/or configure the bitmap related to the MODE 1 resource pool by using SFN 0 based on the timing derived from the synchronization source having the base station as the synchronization reference, instead of DFN 0 based on the timing derived from the GNSS and/or the synchronization source having the GNSS as the synchronization reference. For example, if at least one of the first condition and/or the second condition proposed below is satisfied, the MODE 1 UE may perform SL communication based on MODE 1 by using SFN 0 based on the timing derived from the synchronization source having the base station as the synchronization reference. That is, if at least one of the first condition and/or the second condition proposed below is satisfied, the MODE 1 UE may perform SL communication based on MODE 1 by using SFN 0 based on the timing derived from the synchronization source having the base station as the synchronization reference, instead of DFN 0 based on the timing derived from the GNSS and/or the synchronization source having the GNSS as the synchronization reference.

2) Proposed Method #1-2

For example, if at least one of the first condition and/or the second condition proposed below is satisfied, the MODE 1 UE may apply the bitmap related to the MODE 1 resource pool by using DFN 0 based on the timing derived from the GNSS and/or the synchronization source having the GNSS as the synchronization reference. For example, if at least one of the first condition and/or the second condition proposed below is satisfied, the MODE 1 UE may perform SL communication based on MODE 1 by using DFN 0 based on the timing derived from the GNSS and/or the synchronization source having GNSS as the synchronization reference. For example, if at least one of the first condition and/or the second condition proposed below is satisfied, and if the GNSS is set as the highest priority synchronization reference for the MODE 1 UE, the MODE 1 UE may apply the bitmap related to the MODE 1 resource pool by using DFN 0 based on the timing derived from the GNSS and/or the synchronization source having the GNSS as the synchronization reference. For example, if at least one of the first condition and/or the second condition proposed below is satisfied, and/or if the GNSS is set as the highest priority synchronization reference for the MODE 1 UE, the MODE 1 UE may perform SL communication based on MODE 1 by using DFN 0 based on the timing derived from the GNSS and/or the synchronization source having GNSS as the synchronization reference. For example, if at least one of the first condition and/or the second condition proposed below is satisfied, and/or if the MODE 1 UE selects the GNSS as the synchronization reference, the MODE 1 UE may apply the bitmap related to the MODE 1 resource pool by using DFN 0 based on the timing derived from the GNSS. For example, if at least one of the first condition and/or the second condition proposed below is satisfied, and/or if the MODE 1 UE selects the GNSS as the synchronization reference, the MODE 1 UE may perform SL communication based on MODE 1 by using DFN 0 based on the timing derived from the GNSS.

As described above, even though at least one of the first condition and/or the second condition proposed below is satisfied, if the MODE 1 UE uses DFN 0 based on the timing derived from the GNSS and/or the synchronization source having the GNSS as the synchronization reference, the MODE 1 UE may not expect that the PUCCH resource having the PSFCH resource as the reference timing is configured. For example, the MODE 1 UE may determine that the PUCCH resource having the PSFCH resource as the reference timing is not configured.

3) Proposed Method #1-3

For example, if at least one of the first condition and/or the second condition proposed below is satisfied, and/or if the MODE 1 UE performs SL communication based on MODE 1, the MODE 1 UE may not expect that a synchronization priority of the GNSS is set to the highest priority. For example, if at least one of the first condition and/or the second condition proposed below is satisfied, and/or if the MODE 1 UE performs SL communication based on MODE 1, the MODE 1 UE may determine that the synchronization priority of the GNSS is not set to the highest priority. For example, if at least one of the first condition and/or the second condition proposed below is satisfied, and/or if the MODE 1 UE performs SL communication based on MODE 1, the MODE 1 UE may expect that the synchronization priority of the base station is set to the highest priority. For example, if at least one of the first condition and/or the second condition proposed below is satisfied, and/or if the MODE 1 UE performs SL communication based on MODE 1, the MODE 1 UE may determine that the synchronization priority of the base station is set to the highest priority.

Hereinafter, the first condition and/or the second condition will be specifically described.

(1) First Condition: for example, a difference value (hereinafter, TIME_DIFVAL) between a first timing derived from a GNSS and/or a synchronization source having the GNSS as a synchronization reference and a second timing derived from a base station and/or a synchronization source having the base station as a synchronization reference is greater than a pre-configured threshold (hereinafter, TIME_THVAL)

For example, the MODE 1 UE may obtain the first timing from the GNSS and/or the synchronization source having the GNSS as the synchronization reference, and the MODE 1 UE may obtain the second timing from the base station and/or the synchronization source having the base station as the synchronization reference. For example, the first timing and the second timing may be timing values measured and/or determined by the MODE 1 UE.

For example, TIME_DIFVAL may be defined as one of the following (some) values. For example, TIME_DIFVAL may be a (time) difference value between DFN 0 determined based on the first timing and SFN 0 determined based on the second timing. For example, TIME_DIFVAL may be a (time) difference value between a slot determined based on the first timing and a slot determined based on the second timing. For example, TIME_DIFVAL may be a (time) difference value between a symbol determined based on the first timing and a symbol determined based on the second timing.

For example, TIME_THVAL may be defined in the form of at least one of a CP length, the number of slots, the number of symbols, and/or an absolute time value. For example, TIME_DIFVAL may be defined in the form of at least one of a CP length, the number of slots, the number of symbols, and/or an absolute time value. For example, the numerology of TIME_THVAL may be defined as a numerology related to SL communication. For example, the numerology of TIME_DIFVAL may be defined as a numerology related to SL communication. For example, the numerology of TIME_THVAL may be defined as a numerology related to Uu communication of the MODE 1 UE. For example, the numerology of TIME_DIFVAL may be defined as a numerology related to Uu communication of the MODE 1 UE. For example, the numerology may include at least one of a subcarrier spacing, a CP length, and/or a CP type. For example, Uu communication may include UL communication or DL communication. For example, TIME_THVAL may be predefined for the MODE 1 UE. For example, the base station/network may pre-configure or configure TIME_THVAL for the MODE 1 UE. For example, the base station/network may transmit information related to TIME_THVAL to the MODE 1 UE.

For example, in order to determine whether the first condition is satisfied, the MODE 1 UE may obtain the first timing from the GNSS and/or the synchronization source having the GNSS as the synchronization reference, and the MODE 1 UE may obtain the second timing from the base station and/or the synchronization source having the base station as the synchronization reference. In addition, the MODE 1 UE may obtain TIME_DIFVAL by comparing the first timing and the second timing. In addition, the MODE 1 UE may compare TIME_DIFVAL and TIME_THVAL.

(2) Second Condition: for example, if a carrier on which SL communication based on MODE 1 is performed by the MODE 1 UE is a licensed carrier, and/or if a carrier including a resource pool on which SL communication based on MODE 1 is performed by the MODE 1 UE is a licensed carrier For example, the carrier may be a carrier through which information related to the resource pool for SL communication based on MODE 1 is received. For example, the MODE 1 UE may receive information related to the resource pool for SL communication based on MODE 1 through the carrier. For example, the carrier may be a carrier through which DCI for SL communication based on MODE 1 is received. For example, MODE 1 UE may receive DCI for SL communication based on MODE 1 through the carrier. For example, the carrier may be a carrier in which a serving cell of the MODE 1 UE exists.

2. Proposed Method #2

For example, the MODE 1 UE may perform SL communication based on MODE 1 on a second carrier. For example, the MODE 1 UE may perform SL communication based on MODE 1 on the second carrier other than a first carrier. For example, the first carrier may be a licensed carrier. For example, the second carrier may be an ITS-dedicated carrier. For example, the second carrier may be an unlicensed carrier. For example, the first carrier may be a carrier in which the serving cell of the MODE 1 UE exists. For example, the second carrier may be a carrier in which the serving cell of the MODE 1 UE does not exist. For example, the first carrier may be a synchronization reference carrier related to SL communication based on MODE 1. For example, the second carrier may be a carrier other than a synchronization reference carrier related to SL communication based on MODE 1.

For example, if the MODE 1 UE performs SL communication based on MODE 1 on the second carrier, a problem in which performance of SL communication or UL communication with a relatively high priority and/or a relatively high requirement (e.g., reliability and/or latency) is deteriorated may occur due to power sharing between the UL communication and the SL communication of the MODE 1 UE. For example, if the MODE 1 UE performs SL communication based on MODE 1 on the second carrier, a problem in which performance of SL communication or UL communication with a relatively high priority and/or a relatively high requirement (e.g., reliability and/or latency) is deteriorated may occur due to the MODE 1 UE dropping the UL transmission or the SL transmission. Therefore, in order to alleviate the above problem, the MODE 1 UE may be configured to apply the first condition of the proposed method #1. For example, the MODE 1 UE may apply the first condition of the proposed method #1.

3. Proposed Method #3

For example, the MODE 1 UE may be configured to report at least one of the first information and/or the second information proposed below to a serving cell of the MODE 1 UE. For example, the MODE 1 UE may report at least one of the first information and/or the second information proposed below to the serving cell of the MODE 1 UE. For example, in the case of the proposed method #1 and/or the proposed method #2, the MODE 1 UE may report at least one of the first information and/or the second information proposed below to the serving cell of the MODE 1 UE. For example, at least one of the first information and/or the second information proposed below may be reported to the base station through the serving cell of the MODE 1 UE. For example, the serving cell of the MODE 1 UE may be a cell for scheduling/transmitting DCI related to SL communication based on MODE 1 to the MODE 1 UE.

For example, at least one of the first information and/or the second information proposed below may be expressed based on a numerology related to SL communication. For example, at least one of the first information and/or the second information proposed below may be expressed based on a numerology related to Uu communication of the MODE 1 UE. For example, at least one of the first information and/or the second information proposed below may be expressed as an absolute time value. For example, at least one of the first information and/or the second information proposed below may be expressed as the number of slots. For example, at least one of the first information and/or the second information proposed below may be expressed as the number of symbols.

For example, in order to align a timing of a resource pool determined by the out-of-coverage UE and/or the MODE 2 UE and a timing of a resource pool determined by the in-coverage UE and/or the MODE 1 UE, it may be defined to signal at least one of the first information and/or the second information proposed below. For example, the in-coverage UE and/or the MODE 1 UE may be a MODE 1 UE performing S-SSB transmission including PSBCH. For example, the in-coverage UE and/or the MODE 1 UE may transmit at least one of the first information and/or the second information proposed below to the out-of-coverage UE and/or the MODE 2 UE through the PSBCH. For example, at least one of the first information and/or the second information proposed below may be transmitted through pre-defined signaling. For example, the pre-defined signaling may include (pre-)configuration and/or SIB.

For example, at least one of the first information and/or the second information proposed below may be defined in the form of at least one of the number of slots, the number of symbols, and/or an absolute time value. For example, a numerology related to at least one of the first information and/or the second information proposed below may be defined as a numerology related to SL communication. For example, a numerology related to at least one of the first information and/or the second information suggested below may be defined as a numerology related to Uu communication of the MODE 1 UE.

Hereinafter, the first information and/or the second information will be specifically described.

(1) First information: a (time) difference value between SFN 0 derived based on the timing of the serving cell and DFN 0 derived based on the timing of the GNSS and/or the synchronization source having the GNSS as the synchronization reference (2) Second information: a (time) difference value between a slot boundary derived based on the timing of the serving cell and a slot boundary derived based on the timing of the GNSS and/or the synchronization source having the GNSS as the synchronization reference, or a (time) difference value between a symbol boundary derived based on the timing of the serving cell and a symbol boundary derived based on the timing of the GNSS and/or the synchronization source having the GNSS as the synchronization reference 4. Proposed Method #4

For example, MODE 1 UE may perform MODE 1 SL communication in a situation in which the GNSS is set to the highest synchronization priority. For example, the MODE 1 UE may be configured to perform synchronization based on the first column of Table Z1. That is, for example, the base station may configure the MODE 1 UE such that the MODE 1 UE performs GNSS-based synchronization (preferentially).

TABLE 5

| Priority Level | First Column GNSS-based synchronization | Second Column BS-based synchronization (eNB/gNB-based synchronization) |
| --- | --- | --- |
| P0 | GNSS | BS |
| P1 | All UE directly synchronized with GNSS | All UE directly synchronized with BS |
| P2 | All UE indirectly synchronized with GNSS | All UE indirectly synchronized with BS |
| P3 | BS | GNSS |
| P4 | All UE directly synchronized with BS | All UE directly synchronized with GNSS |
| P5 | All UE indirectly synchronized with BS | All UE indirectly synchronized with GNSS |
| P6 | remaining UE(s) having lowest priority | remaining UE(s) having lowest priority |

For example, if the MODE 1 UE is configured to perform GNSS-based synchronization, the MODE 1 UE may expect that the base station-based synchronization priority (i.e., P3, P4, and P5) is always enabled. For example, if the MODE 1 UE is configured to perform GNSS-based synchronization, the MODE 1 UE may determine that the base station-based synchronization priority (i.e., P3, P4, and P5) is always enabled. Herein, for example, if the above-mentioned rule is applied, if the MODE 1 UE does not detect the GNSS and/or the synchronization source having the GNSS as the synchronization reference, the MODE 1 UE may fall back to the base station-based timing (e.g., SFN0). For example, if the above-mentioned rule is applied, if the MODE 1 UE does not detect the GNSS and/or the synchronization source having the GNSS as the synchronization reference with a reliability greater than or equal to a pre-configured threshold, the MODE 1 UE may fall back to the base station-based timing (e.g., SFN0). For example, the MODE 1 UE may perform SL communication based on the base station-based timing (e.g., SFN0).

Figure 12:
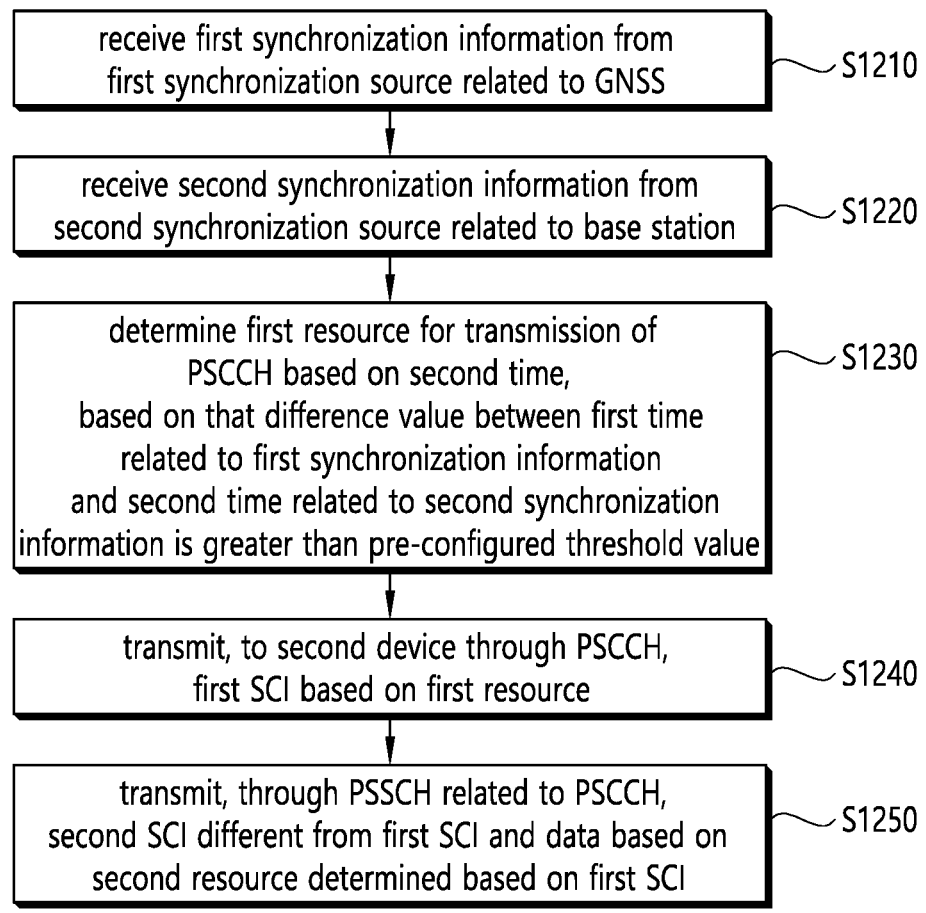
FIG. 12 shows a method for a first device to perform sidelink communication based on an embodiment of the present disclosure.

FIG. 12 shows a method for a first device to perform sidelink communication based on an embodiment of the present disclosure.

The operations disclosed in the flowchart of FIG. 12 may be performed in combination with various embodiments of the present disclosure. In an embodiment, the operations disclosed in the flowchart of FIG. 12 may be performed based on at least one of the devices illustrated in FIGS. 14 to 19. In an embodiment, the first device of FIG. 12 may correspond to the first wireless device 100 of FIG. 15 to be described later, and the second device of FIG. 12 may correspond to the second wireless device 200 of FIG. 15 to be described later. In another embodiment, the first device of FIG. 12 may correspond to the second wireless device 200 of FIG. 15 to be described later, and the second device of FIG. 12 may correspond to the first wireless device 100 of FIG. 15 to be described later.

In step S1210, the first device according to an embodiment may receive first synchronization information from a first synchronization source related to a global navigation satellite system (GNSS).

In an embodiment, the first synchronization source related to the GNSS may represent the GNSS or a UE having the GNSS as a synchronization reference.

In step S1220, the first device according to an embodiment may receive second synchronization information from a second synchronization source related to a base station.

In an embodiment, the second synchronization source related to the base station may represent the base station or a UE having the base station as a synchronization reference.

In step S1230, the first device according to an embodiment may determine a first resource for transmission of a physical sidelink control channel (PSCCH) based on a second time, based on that a difference value between a first time related to the first synchronization information and the second time related to the second synchronization information is greater than a pre-configured threshold value.

In an embodiment, the first time may represent a time derived based on the GNSS. In addition, the second time may represent a time derived based on the base station.

In step S1240, the first device according to an embodiment may transmit, to a second device through the PSCCH, first sidelink control information (SCI) based on the first resource.

In step S1250, the first device according to an embodiment may transmit, through a physical sidelink shared channel (PSSCH) related to the PSCCH, second SCI different from the first SCI and data based on a second resource determined based on the first SCI.

In an embodiment, based on that the difference value between the first time and the second time is greater than the threshold value, the base station may be set to the highest synchronization source priority order of the first device.

In an embodiment, the first time may represent direct frame number (DFN) 0, and the second time may represent system frame number (SFN) 0.

In an embodiment, the first time may represent a first slot or a first symbol determined based on the GNSS, and the second time may represent a second slot or a second symbol determined based on the base station.

In an embodiment, based on that the GNSS is set to the highest synchronization source priority order of the first device, a fourth priority, a fifth priority, and a sixth priority of a GNSS-based synchronization priority configuration information may be enabled. The GNSS-based synchronization priority configuration information may include at least one of a first priority, a second priority, a third priority, the fourth priority, the fifth priority, the sixth priority, and a seventh priority. The fourth priority, the fifth priority and the sixth priority may be related to a synchronization source based on the base station.

In an embodiment, the fourth priority may be a priority related to the base station, and the fifth priority may be a priority related to a user equipment (UE) that is directly synchronized with the base station, and the sixth priority may be a priority related to a UE that is indirectly synchronized with the base station.

For example, referring to Table 5 above, the fourth priority may be P3, the fifth priority may be P4, and the sixth priority may be P5. That is, referring to the first column of Table 5, the fourth priority of the GNSS-based synchronization priority configuration information may be 'base station', the fifth priority of the GNSS-based synchronization priority configuration information may be 'all UEs directly synchronized with base station', and the sixth priority of the GNSS-based synchronization priority configuration information may be 'all UEs indirectly synchronized with base station'.

In an embodiment, based on that the GNSS is set to the highest synchronization source priority order of the first device, a physical uplink control channel (PUCCH) resource based on a physical sidelink feedback channel (PSFCH) resource may not be configured.

In an embodiment, the first synchronization source may be the GNSS, a UE directly synchronized with the GNSS, a UE indirectly synchronized with the GNSS, or a UE not synchronized with the GNSS.

In an embodiment, the second synchronization source may be the base station, a UE directly synchronized with the base station, a UE indirectly synchronized with the base station, or a UE not synchronized with the base station.

In an embodiment, based on that a carrier for mode 1 sidelink communication of the first device is a licensed carrier, the first resource for transmission of the PSCCH may be determined based on the second time.

In an embodiment, a numerology of the threshold value may be a numerology related to sidelink communication.

The first device according to an embodiment may transmit (or report) information regarding the difference value between the first time and the second time to the base station.

Based on an embodiment of the present disclosure, a first device adapted to perform sidelink communication may be provided. The first device may comprise: at least one memory storing instructions; at least one transceiver; and at least one processor connected to the at least one memory and the at least one transceiver, wherein the at least one processor executes the instructions to: control the at least one transceiver to receive first synchronization information from a first synchronization source related to a global navigation satellite system (GNSS); control the at least one transceiver to receive second synchronization information from a second synchronization source related to a base station; determine a first resource for transmission of a physical sidelink control channel (PSCCH) based on a second time, based on that a difference value between a first time related to the first synchronization information and the second time related to the second synchronization information is greater than a pre-configured threshold value; control the at least one transceiver to transmit, to a second device through the PSCCH, first sidelink control information (SCI) based on the first resource; and control the at least one transceiver to transmit, through a physical sidelink shared channel (PSSCH) related to the PSCCH, second SCI different from the first SCI and data based on a second resource determined based on the first SCI.

Based on an embodiment of the present disclosure, a device (or chip(set)) adapted to control a first user equipment (UE) may be provided. The device may comprise: at least one processor; and at least one memory connected to the at least one processor and storing instructions, wherein the at least one processor executes the instructions to: receive first synchronization information from a first synchronization source related to a global navigation satellite system (GNSS); receive second synchronization information from a second synchronization source related to a base station; determine a first resource for transmission of a physical sidelink control channel (PSCCH) based on a second time, based on that a difference value between a first time related to the first synchronization information and the second time related to the second synchronization information is greater than a pre-configured threshold value; transmit, to a second device through the PSCCH, first sidelink control information (SCI) based on the first resource; and transmit, through a physical sidelink shared channel (PSSCH) related to the PSCCH, second SCI different from the first SCI and data based on a second resource determined based on the first SCI.

In an embodiment, the first UE of the embodiment may refer to the first device described throughout the present disclosure. In an embodiment, the at least one processor, the at least one memory and the like in the device for controlling the first UE may be implemented as separate sub-chips, respectively, alternatively, at least two or more components may be implemented through one sub-chip.

Based on an embodiment of the present disclosure, a non-transitory computer-readable storage medium storing instructions may be provided. The non-transitory computer-readable storage medium storing instructions may, when executed, cause a first device to: receive first synchronization information from a first synchronization source related to a global navigation satellite system (GNSS); receive second synchronization information from a second synchronization source related to a base station; determine a first resource for transmission of a physical sidelink control channel (PSCCH) based on a second time, based on that a difference value between a first time related to the first synchronization information and the second time related to the second synchronization information is greater than a pre-configured threshold value; transmit, to a second device through the PSCCH, first sidelink control information (SCI) based on the first resource; and transmit, through a physical sidelink shared channel (PSSCH) related to the PSCCH, second SCI different from the first SCI and data based on a second resource determined based on the first SCI.

Figure 13:
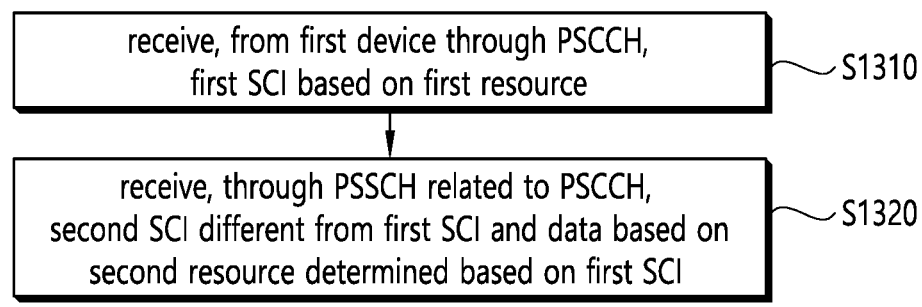
FIG. 13 shows a method for a second device to perform sidelink communication based on an embodiment of the present disclosure.

FIG. 13 shows a method for a second device to perform sidelink communication based on an embodiment of the present disclosure.

The operations disclosed in the flowchart of FIG. 13 may be performed in combination with various embodiments of the present disclosure. In an embodiment, the operations disclosed in the flowchart of FIG. 13 may be performed based on at least one of the devices illustrated in FIGS. 14 to 19. In an embodiment, the second device of FIG. 13 may correspond to the second wireless device 200 of FIG. 15 to be described later, and the first device of FIG. 13 may correspond to the first wireless device 100 of FIG. 15 to be described later. In another embodiment, the second device of FIG. 13 may correspond to the first wireless device 100 of FIG. 15 to be described later, and the first device of FIG. 13 may correspond to the second wireless device 200 of FIG. 15 to be described later.

In step S1310, the second device according to an embodiment may receive, from a first device through a physical sidelink control channel (PSCCH), first sidelink control information (SCI) based on a first resource.

In step S1320, the second device according to an embodiment may receive, through a physical sidelink shared channel (PSSCH) related to the PSCCH, second SCI different from the first SCI and data based on a second resource determined based on the first SCI.

In an embodiment, first synchronization information may be received by the first device from a first synchronization source related to a global navigation satellite system (GNSS).

In an embodiment, second synchronization information may be received by the first device from a second synchronization source related to a base station.

In an embodiment, based on that a difference value between a first time related to the first synchronization information and a second time related to the second synchronization information is greater than a pre-configured threshold value, the first resource for transmission of the PSCCH may be determined by the first device based on the second time.

In an embodiment, based on that the difference value between the first time and the second time is greater than the threshold value, the base station may be set to the highest synchronization source priority order of the first device.

In an embodiment, the first time may represent direct frame number (DFN) 0, and the second time may represent system frame number (SFN) 0.

In an embodiment, the first time may represent a first slot or a first symbol determined based on the GNSS, and the second time may represent a second slot or a second symbol determined based on the base station.

In an embodiment, based on that the GNSS is set to the highest synchronization source priority order of the first device, a fourth priority, a fifth priority, and a sixth priority of a GNSS-based synchronization priority configuration information may be enabled. The GNSS-based synchronization priority configuration information may include at least one of a first priority, a second priority, a third priority, the fourth priority, the fifth priority, the sixth priority, and a seventh priority. The fourth priority, the fifth priority and the sixth priority may be related to a synchronization source based on the base station.

In an embodiment, the fourth priority may be a priority related to the base station, and the fifth priority may be a priority related to a user equipment (UE) that is directly synchronized with the base station, and the sixth priority may be a priority related to a UE that is indirectly synchronized with the base station.

In an embodiment, based on that the GNSS is set to the highest synchronization source priority order of the first device, a physical uplink control channel (PUCCH) resource based on a physical sidelink feedback channel (PSFCH) resource may not be configured.

In an embodiment, the first synchronization source may be the GNSS, a UE directly synchronized with the GNSS, a UE indirectly synchronized with the GNSS, or a UE not synchronized with the GNSS.

In an embodiment, the second synchronization source may be the base station, a UE directly synchronized with the base station, a UE indirectly synchronized with the base station, or a UE not synchronized with the base station.

In an embodiment, based on that a carrier for mode 1 sidelink communication of the first device is a licensed carrier, the first resource for transmission of the PSCCH may be determined based on the second time.

In an embodiment, a numerology of the threshold value may be a numerology related to sidelink communication.

In an embodiment, information regarding the difference value between the first time and the second time may be transmitted (or reported) by the first device to the base station.

Based on an embodiment of the present disclosure, a second device adapted to perform sidelink communication may be provided. The second device may comprise: at least one memory storing instructions; at least one transceiver; and at least one processor connected to the at least one memory and the at least one transceiver, wherein the at least one processor executes the instructions to: control the at least one transceiver to receive, from a first device through a physical sidelink control channel (PSCCH), first sidelink control information (SCI) based on a first resource; and control the at least one transceiver to receive, through a physical sidelink shared channel (PSSCH) related to the PSCCH, second SCI different from the first SCI and data based on a second resource determined based on the first SCI, wherein first synchronization information is received by the first device from a first synchronization source related to a global navigation satellite system (GNSS), wherein second synchronization information is received by the first device from a second synchronization source related to a base station, and wherein, based on that a difference value between a first time related to the first synchronization information and a second time related to the second synchronization information is greater than a pre-configured threshold value, the first resource for transmission of the PSCCH is determined by the first device based on the second time.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
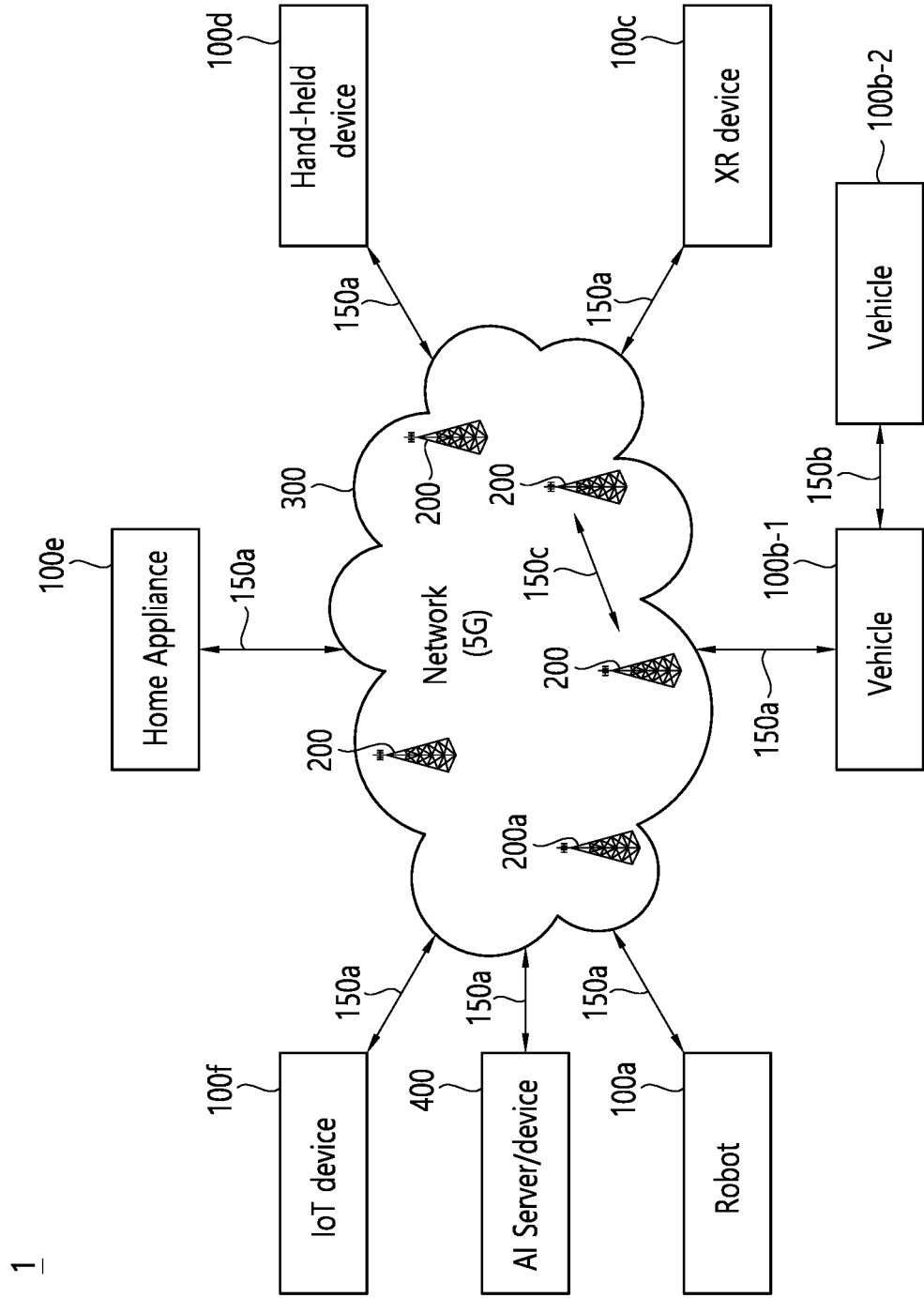
FIG. 14 shows a communication system 1, based on an embodiment of the present disclosure.

FIG. 14 shows a communication system 1, based on an embodiment of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
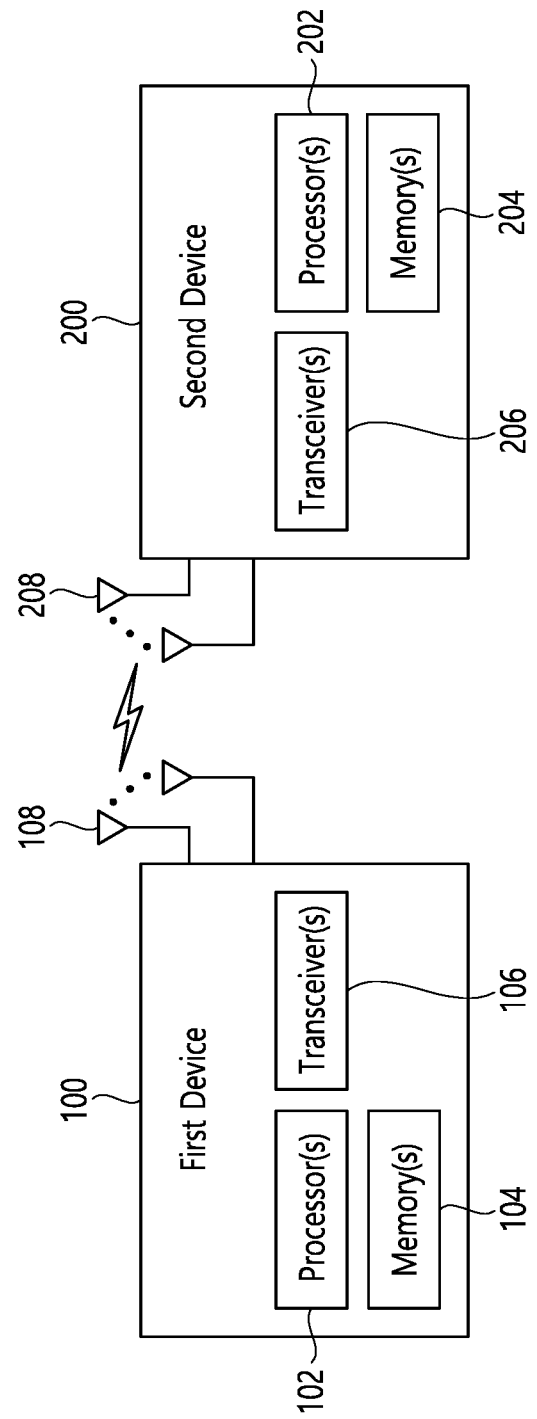
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
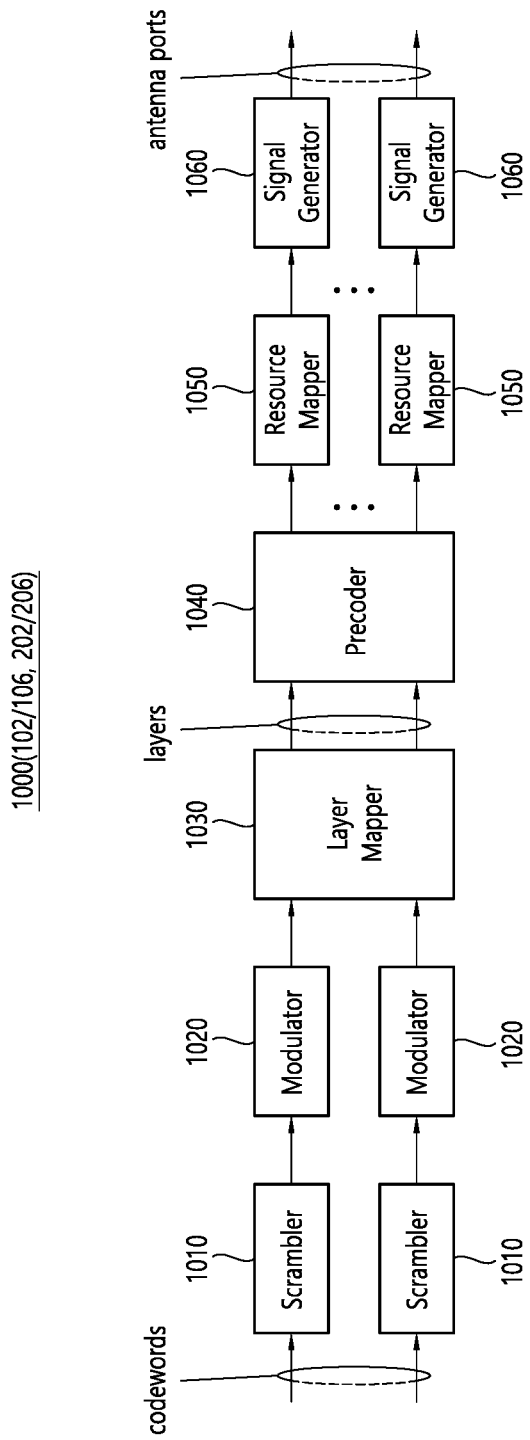
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
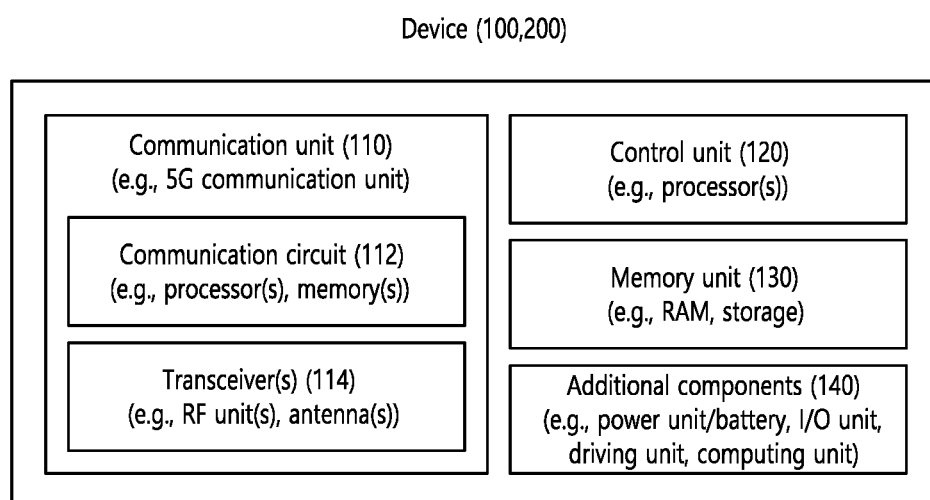
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
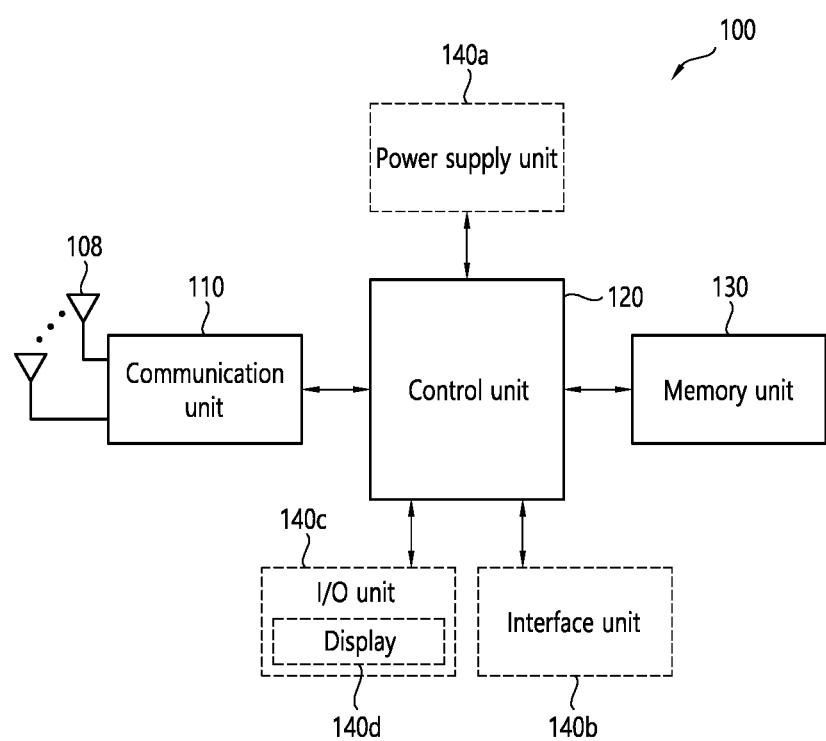
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 19:
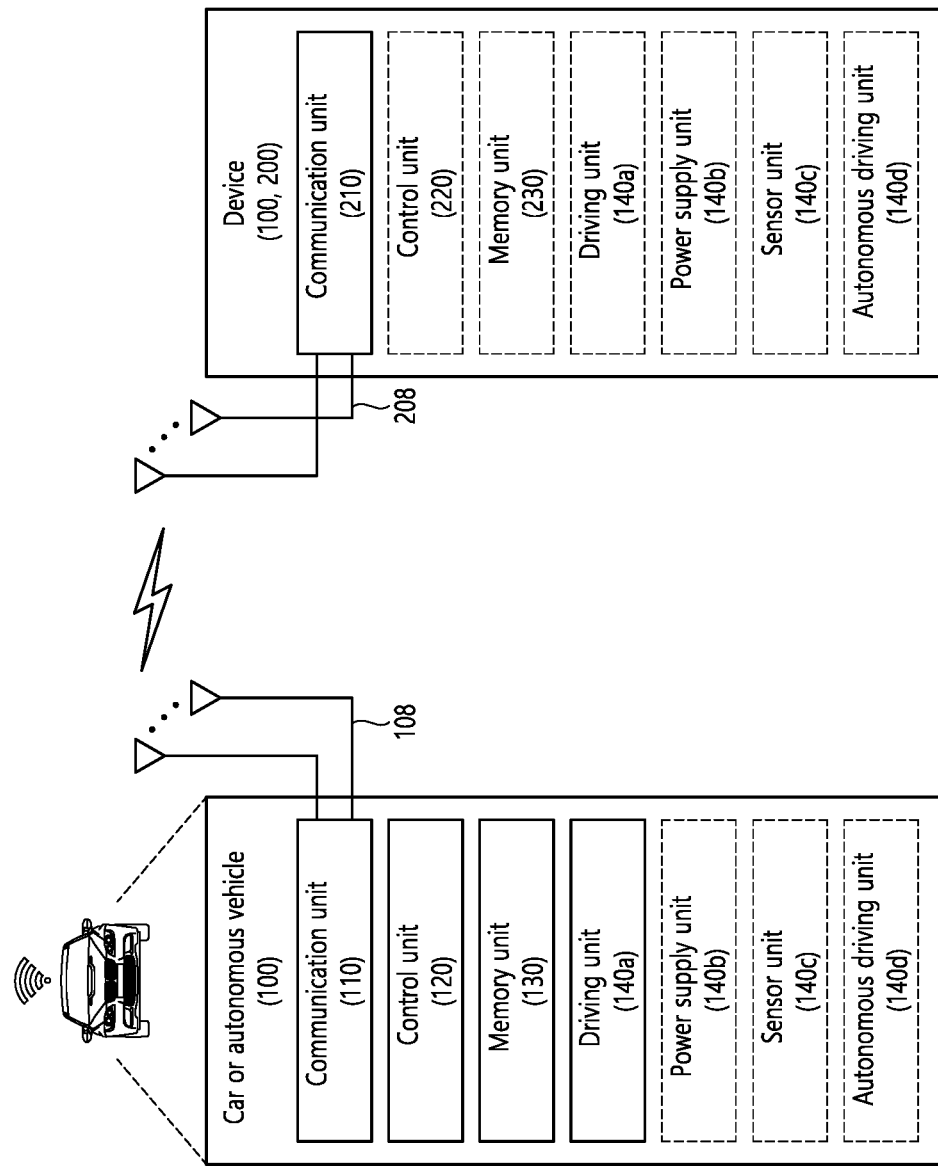
FIG. 19 shows a vehicle or an autonomous vehicle, based on an embodiment of the present disclosure.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink communication by a first device, the method comprising:
   receiving first synchronization information from a first synchronization source related to a global navigation satellite system (GNSS);
   receiving second synchronization information from a second synchronization source related to a base station;
   determining a first resource for transmission of a physical sidelink control channel (PSCCH) based on a second time, based on that a difference value between a first time related to the first synchronization information and the second time related to the second synchronization information is greater than a threshold value,
   wherein a numerology of the threshold value is a numerology related to sidelink communication;
   transmitting, to a second device through the PSCCH, first sidelink control information (SCI) based on the first resource; and
   transmitting, through a physical sidelink shared channel (PSSCH) related to the PSCCH, second SCI and data based on a second resource determined based on the first SCI.

2. The method of claim 1, wherein, based on that the difference value between the first time and the second time is greater than the threshold value, the base station is set to a highest synchronization source priority order of the first device.

3. The method of claim 1, wherein the first time represents direct frame number (DFN) 0, and the second time represents system frame number (SFN) 0.

4. The method of claim 1, wherein the first time represents a first slot or a first symbol determined based on the GNSS, and the second time represents a second slot or a second symbol determined based on the base station.

5. The method of claim 1, wherein, based on that the GNSS is set to a highest synchronization source priority order of the first device, a fourth priority, a fifth priority, and a sixth priority of a GNSS-based synchronization priority configuration information are enabled,
   wherein the GNSS-based synchronization priority configuration information includes at least one of a first priority, a second priority, a third priority, the fourth priority, the fifth priority, the sixth priority, and a seventh priority, and
   wherein the fourth priority, the fifth priority and the sixth priority are related to a synchronization source based on the base station.

6. The method of claim 5, wherein the fourth priority is a priority related to the base station,
   wherein the fifth priority is a priority related to a user equipment (UE) that is directly synchronized with the base station, and
   wherein the sixth priority is a priority related to a UE that is indirectly synchronized with the base station.

7. The method of claim 1, wherein, based on that the GNSS is set to a highest synchronization source priority order of the first device, a physical uplink control channel (PUCCH) resource based on a physical sidelink feedback channel (PSFCH) resource is not configured.

8. The method of claim 1, wherein the first synchronization source is the GNSS, a UE directly synchronized with the GNSS, a UE indirectly synchronized with the GNSS, or a UE not synchronized with the GNSS.

9. The method of claim 1, wherein the second synchronization source is the base station, a UE directly synchronized with the base station, a UE indirectly synchronized with the base station, or a UE not synchronized with the base station.

10. The method of claim 1, wherein, based on that a carrier for mode 1 sidelink communication of the first device is a licensed carrier, the first resource for transmission of the PSCCH is determined based on the second time.

11. The method of claim 1, further comprising:
transmitting, to the base station, information regarding the difference value between the first time and the second time.

12. A first device adapted to perform sidelink communication, the first device comprising:
at least one memory storing instructions;
at least one transceiver; and
at least one processor connected to the at least one memory and the at least one transceiver, wherein the at least one processor executes the instructions to:
control the at least one transceiver to receive first synchronization information from a first synchronization source related to a global navigation satellite system (GNSS);
control the at least one transceiver to receive second synchronization information from a second synchronization source related to a base station;
determine a first resource for transmission of a physical sidelink control channel (PSCCH) based on a second time, based on that a difference value between a first time related to the first synchronization information and the second time related to the second synchronization information is greater than a threshold value,
wherein a numerology of the threshold value is a numerology related to sidelink communication;
control the at least one transceiver to transmit, to a second device through the PSCCH, first sidelink control information (SCI) based on the first resource; and
control the at least one transceiver to transmit, through a physical sidelink shared channel (PSSCH) related to the PSCCH, second SCI and data based on a second resource determined based on the first SCI.

13. The first device of claim 12, wherein, based on that the difference value between the first time and the second time is greater than the threshold value, the base station is set to a highest synchronization source priority order of the first device.

14. The first device of claim 12, wherein the first time represents direct frame number (DFN) 0, and the second time represents system frame number (SFN) 0.

15. The first device of claim 12, wherein the first time represents a first slot or a first symbol determined based on the GNSS, and the second time represents a second slot or a second symbol determined based on the base station.

16. A processing device adapted to control a first device, the processing device comprising:
at least one processor; and
at least one memory connected to the at least one processor and storing instructions, wherein the at least one processor executes the instructions to:
receive first synchronization information from a first synchronization source related to a global navigation satellite system (GNSS);
receive second synchronization information from a second synchronization source related to a base station;
determine a first resource for transmission of a physical sidelink control channel (PSCCH) based on a second time, based on that a difference value between a first time related to the first synchronization information and the second time related to the second synchronization information is greater than a threshold value,
wherein a numerology of the threshold value is a numerology related to sidelink communication;
transmit, to a second device through the PSCCH, first sidelink control information (SCI) based on the first resource; and
transmit, through a physical sidelink shared channel (PSSCH) related to the PSCCH, second SCI and data based on a second resource determined based on the first SCI.

17. The processing device of claim 16, wherein, based on that the difference value between the first time and the second time is greater than the threshold value, the base station is set to a highest synchronization source priority order of the first device.

18. The processing device of claim 16, wherein the first time represents direct frame number (DFN) 0, and the second time represents system frame number (SFN) 0.

19. The processing device of claim 16, wherein the first time represents a first slot or a first symbol determined based on the GNSS, and the second time represents a second slot or a second symbol determined based on the base station.

* * * * *